US012736707B2

(12) United States Patent
Zheng et al.

(10) Patent No.: US 12,736,707 B2
(45) Date of Patent: Sep. 15, 2026

(54) SHIELDING DEVICE OF SOURCE MOUNTING AND DEMOUNTING FOR NUCLEAR LOGGING INSTRUMENT

(71) Applicant: Institute of Geology and Geophysics, CAS, Beijing (CN)

(72) Inventors: Jian Zheng, Beijing (CN); Zhongxing Wang, Beijing (CN); Qingyun Di, Beijing (CN); Wenxiu Zhang, Beijing (CN)

(73) Assignee: Institute of Geology and Geophysics, CAS, Beijing (CN)

( * ) Notice: Subject to any disclaimer, the term of this patent is extended or adjusted under 35 U.S.C. 154(b) by 484 days.

(21) Appl. No.: 18/351,853

(22) Filed: Jul. 13, 2023

(65) Prior Publication Data

US 2024/0385345 A1 Nov. 21, 2024

(30) Foreign Application Priority Data

May 17, 2023 (CN) ......................... 202310558460.5

(51) Int. Cl.
*G01V 5/10* (2006.01)
*G21F 1/08* (2006.01)

(52) U.S. Cl.
CPC ................ *G01V 5/10* (2013.01); *G21F 1/085* (2013.01)

(58) Field of Classification Search
CPC ................................. G01V 5/10; G21F 1/085
See application file for complete search history.

(56) References Cited

FOREIGN PATENT DOCUMENTS

CN 107633892 A * 1/2018
CN 209615488 U * 11/2019
CN 111963141 A * 11/2020 ............... G01V 5/04
CN 212250004 U * 12/2020
JP 2001042088 A * 2/2001
KR 101598972 B1 * 3/2016 ............... G21F 1/12
KR 20180041934 A * 4/2018 ............ A61B 6/107

* cited by examiner

*Primary Examiner* — Catherine T. Rastovski
*Assistant Examiner* — Nyla Gavia
(74) *Attorney, Agent, or Firm* — Maine Cernota & Curran

(57) ABSTRACT

Disclosed is a shielding device of source mounting and demounting for a nuclear logging instrument including a device base and a shielding device body. The device base is directly placed on the ground or a well stand. The shielding device body is slidably assembled in an embedded slideway of the device base. During source mounting operation, a worker takes a source from a source container, and a radioactive source passes through the shielding device body through a circular hole of the shielding device body to be installed. During the source demounting operation, the radioactive source and the worker are arranged on both sides of the shielding device body during the operation at an instrument end. Through such design, the worker is allowed to calmly mount and demount the source in a relatively low radiation field.

8 Claims, 5 Drawing Sheets

SHIELDING DEVICE OF SOURCE MOUNTING AND DEMOUNTING FOR NUCLEAR LOGGING INSTRUMENT

RELATED APPLICATION

This patent application claims the benefit and priority of Chinese Patent Application No. 2023105584605, filed on May 17, 2023, the disclosure of which is incorporated by reference herein in its entirety as part of the present application.

TECHNICAL FIELD

The present disclosure relates to the technical field of hydrocarbon well logging, in particular to a shielding device of source mounting and demounting for a nuclear logging instrument.

BACKGROUND

At present, in the field of hydrocarbon well logging, neutron and gamma nuclear logging instruments are widely used in engineering sites. At present, the mounting and demounting of the radioactive source on the nuclear logging instruments are performed manually. Due to the high activity of radioactive source for logging and calibration (generally, the 18Ci Am-241 source is used for compensating neutron logging and the 2Ci Cs-137 source is used for lithologic density logging), great harm to the personal health of workers is caused. In order to minimize the harm of the radioactive sources to the workers, the workers generally should wear lead clothes, lead gloves and other protective equipment when performing operation of the source mounting and demounting, and special lengthened source mounting and demounting tools are used for operation. Protective equipment and source mounting and demounting tools are used, so that the irradiation of the workers can be reduced to a certain extent, but there is still a fundamental problem of insufficient shielding and protection ability. At the same time, in order to shorten the total operation time, considerable requirements are proposed for the proficiency of the workers.

According to three elements of radiation protection, the workers should keep far away from the source as much as possible, consume short operation time and adopt necessary protective measures during mounting and demounting the source. Therefore, the workers use special lengthened source mounting and demounting tools and wear lead clothes and lead gloves when mounting and demounting the source. It has been pointed out that, assuming that the workers have been trained effectively for many times by means of simulated source and have considerable operation experience, the simulation calculation is carried out under this condition, the radiation dose received by the workers who operate the 18Ci Am-241 neutron source one time is about 1.8-2.3 mSv, and the radiation dose received by the workers who operate the 2Ci Cs-137 gamma source one time is about 0.6-1.0 mSv. In the basic standards of radiation health protection in China, limiting values recommended by ICRP are adopted. In order to prevent random effects, it is stipulated that the annual dose equivalent of radioactive workers exposed to uniform whole body irradiation should not exceed 50 mSy (5 rem), and the average annual dose equivalent for five consecutive years should not exceed 20 mSv (2 rem). Obviously, in a manual mounting and demounting method of radioactive source, the workers receive a large dose of strong source irradiation in a short time. More attention should be paid to the fact that in the production, acceptance, field calibration and logging processes of radioactive instruments, the operation frequency of mounting and demounting radioactive source is irregular, and the phenomenon of centralized operation in a short time often occurs, at that time, the irradiation amount received by the workers will increase exponentially on this basis. Therefore, at present, the workers for mounting and demounting sources adopt the methods of alternating operation and strict monitoring of personal irradiation dose to reduce the harm of radiation to personal health. Thus, the labor and management costs are virtually increased.

In conclusion, the problems existing in the prior art are as follows.

Firstly, with the manual mounting and demounting method, short time strong irradiation causes great harm to the personal health of the workers.

Secondly, the shielding ability of the existing protective equipment such as lead clothes and lead gloves is insufficient.

SUMMARY

The present disclosure aims to provide a shielding device of source mounting and demounting for a nuclear logging instrument so as to solve problems in the prior art. A worker of source mounting and demounting is allowed to work at an instrument end at a lower radiation level during operation. The shielding device has the characteristics of simple structure and easy installation and use. The worker can master a using method of the shielding device after simple training. The shielding device has the characteristics of high universality and easy popularization.

In order to achieve the purpose, the present disclosure provides the following solution. The present disclosure provides a shielding device of source mounting and demounting for a nuclear logging instrument, including the following.

A device base, wherein the device base is directly placed on a ground or a well stand and symmetrically spilt into a first section and a second section, one end of the first section is hinged with one end of the second section and another end of the first section is detachably connected to another end of the second section, a top surface of the device base is provided with a circular embedded slideway, a middle part of the device base, located on an inner side of the embedded slideway, is detachably provided with a source receiving plate.

Further, a shielding device body, wherein the shielding device body is of a semicircular structure. A sliding block is arranged at a bottom of the shielding device body, the sliding block is slidably assembled in the embedded slideway, the shielding device body is provided with a circular hole through which a tool of source mounting and demounting passes, and the circular hole corresponds to an instrument source compartment hole in height.

Preferably, a window for visual observation is provided in the shielding device body, and transparent glass is embedded in the window. The circular hole is located below the window.

Preferably, the transparent glass embedded in the shielding device body is filled with different shielding materials according to different types of rays to be shielded.

Preferably, the transparent glass is organic glass or lead glass.

Preferably, the shielding device body is filled with different shielding materials according to different types of rays to be shielded.

Preferably, one end of the first section is hinged with one end of the second section via an axis pin, the other end of the first section is detachably connected to the other end of the second section via a fixing screw. Lifting lugs are symmetrically arranged on first section and the second section of the device base and configured for hoisting the device base.

Preferably, the source receiving plate is installed on the shielding device body via connecting screws. A size of a central hole of the source receiving plate is changed according to a diameter of the nuclear logging instrument.

Preferably, a hole size of the circular hole is φ60 mm. A height of the circular hole from the ground is 1.3 m.

Compared with the prior art, the present disclosure has the following beneficial technical effects.

The shielding device of source mounting and demounting for a nuclear logging instrument in the present disclosure includes a device base and a shielding device body. The device base is directly placed on the ground or a well stand. The shielding device body is slidably assembled in an embedded slideway of the device base. During the source mounting operation, a worker takes the source from a source container, and a radioactive source passes through the shielding device body through a circular hole of the shielding device body to be installed. During the source demounting operation, the radioactive source and the worker are arranged on both sides of the shielding device body during the operation at an instrument end. Through such design, the worker working for a long time at the instrument end is under the protection of the shielding device, and the worker is allowed to calmly mount and demount the source in a relatively low radiation field. The shielding in the present disclosure is pioneered. The worker of source mounting and demounting is allowed to work at an instrument end at a lower radiation level during operation. The shielding device has the characteristics of simple structure and easy installation and use. The worker can master a using method of the shielding device after simple training. The shielding device has the characteristics of high universality and easy popularization. By changing structure filling materials of the shielding device, the shielding device can be applied to source mounting and demounting of radioactive sources such as neutron sources and gamma sources.

BRIEF DESCRIPTION OF THE DRAWINGS

To illustrate the technical solution of the present embodiments of the present disclosure or the prior art more clearly, the following briefly introduces the accompanying drawings to be used in the present embodiments. Apparently, the accompanying drawings in the following description show merely some embodiments of the present disclosure, and those skilled in the art may still derive other drawings from these accompanying drawings without creative efforts.

Reference signs: 1, radioactive logging instrument: 2, shielding device body: 3, window: 4, ground: 5, source container: 6, tool of source mounting and demounting: 7, radioactive source: 8, device base: 9, fixing screw: 10, lifting lug: 11, axis pin: 12, source receiving plate: 13, connecting screw: 14, embedded slideway: 15, circular hole: 16, limiting screw: 17, sliding block: and 18, lifting ring.

DETAILED DESCRIPTION OF THE EMBODIMENTS

The following clearly and completely describes the technical solution in the present embodiments of the present disclosure with reference to the accompanying drawings in the present embodiments of the present disclosure. Apparently, the described embodiments are merely a part rather than all of the present embodiments of the present disclosure. Based on the embodiment in the present disclosure, all other embodiments obtained by a person of ordinary skill in the art without creative effect belong to the scope of the present disclosure.

The present disclosure aims to provide a shielding device of source mounting and demounting for a nuclear logging instrument, so as to solve problems in the prior art. A worker of source mounting and demounting is allowed to work at an instrument end at a lower radiation level during operation. The shielding device has the characteristics of simple structure and easy installation and use. The worker can master a using method of the shielding device after simple training. The shielding device has the characteristics of high universality and easy popularization.

To make the foregoing objective, features and advantages of the present disclosure clearer and more comprehensible, the present disclosure is further described in detail below with reference to the accompanying drawings and specific embodiments.

As shown in FIGS. 1-5, the present disclosure provides a shielding device of source mounting and demounting for a nuclear logging instrument.

The design considerations of the present disclosure are as follows.

Difficulty in solving technical problems in the background is that, an operation process of source mounting and demounting is decomposed in detail to pay close attention to operation contents that take up a long time in the operation process, and two aspects of improving operation portability and strengthening protection are considered.

Significance of solving the above technical problems is that, shielding protective equipment is added, so that the dose rate of radiation irradiation on the worker is reduced to a certain extent, and the personal health of the worker is protected, the cost of personnel and management of related units or companies is reduced.

Figure 2:
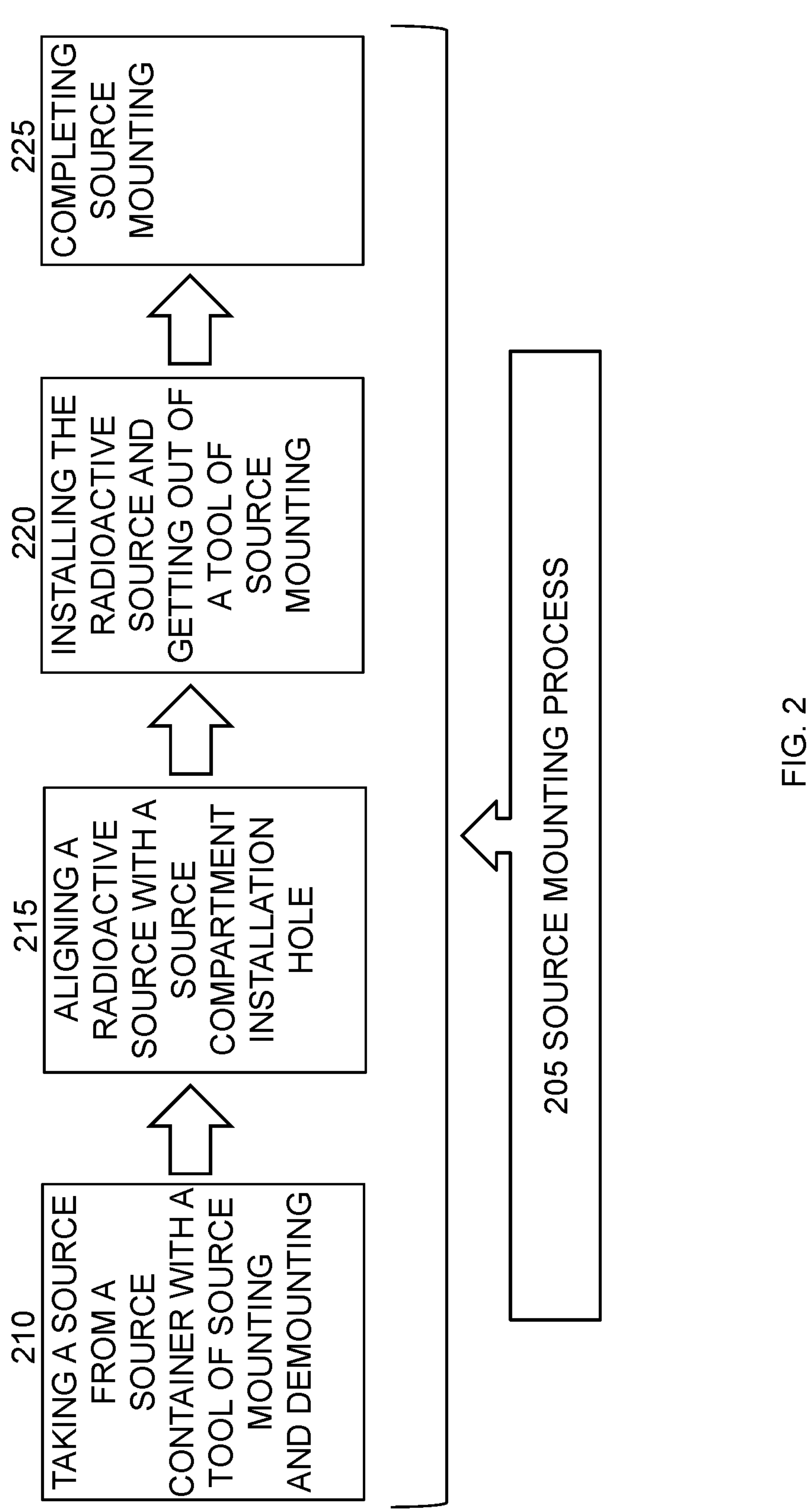
FIG. 2 is an action exploded diagram of an operation process of source mounting provided by the present disclosure.
Figure 3:
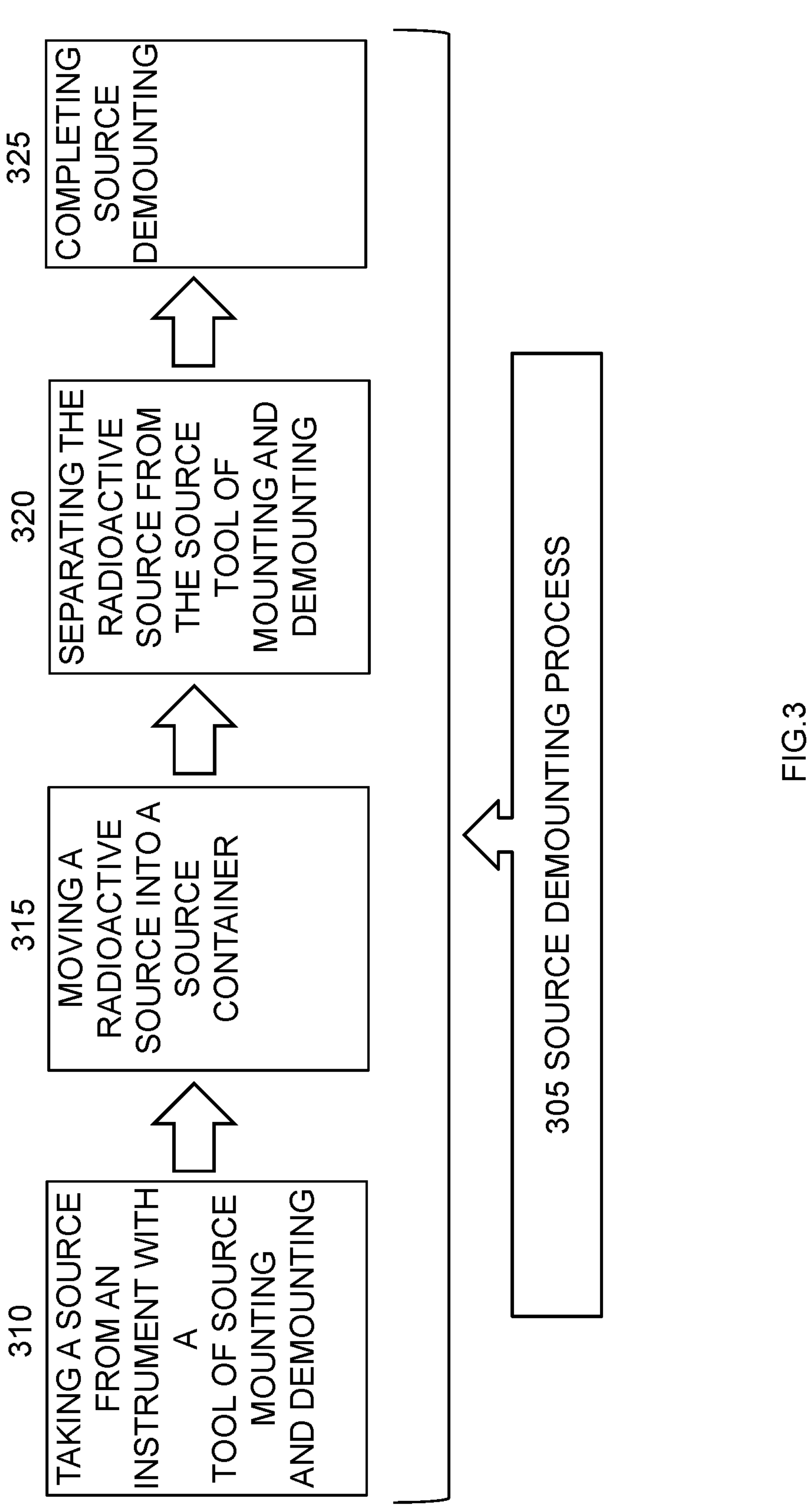
FIG. 3 is an action exploded diagram of an operation process of source demounting provided by the present disclosure.
Figure 4:
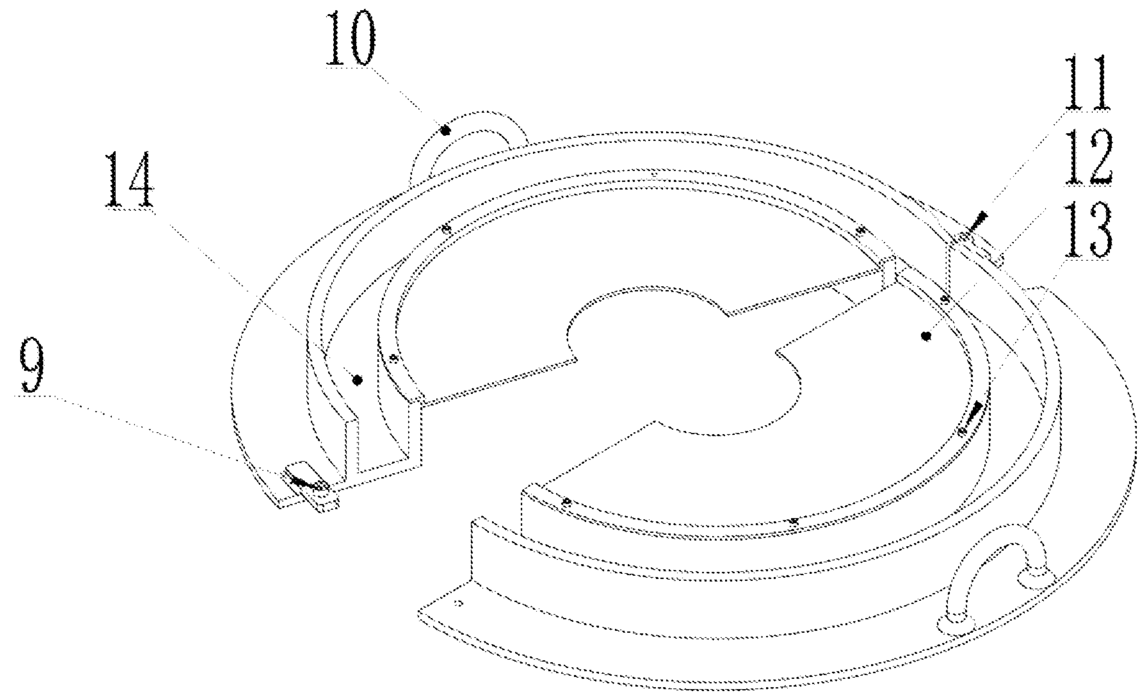
FIG. 4 is a structural schematic diagram of a device base provided by the present disclosure.
Figure 5:
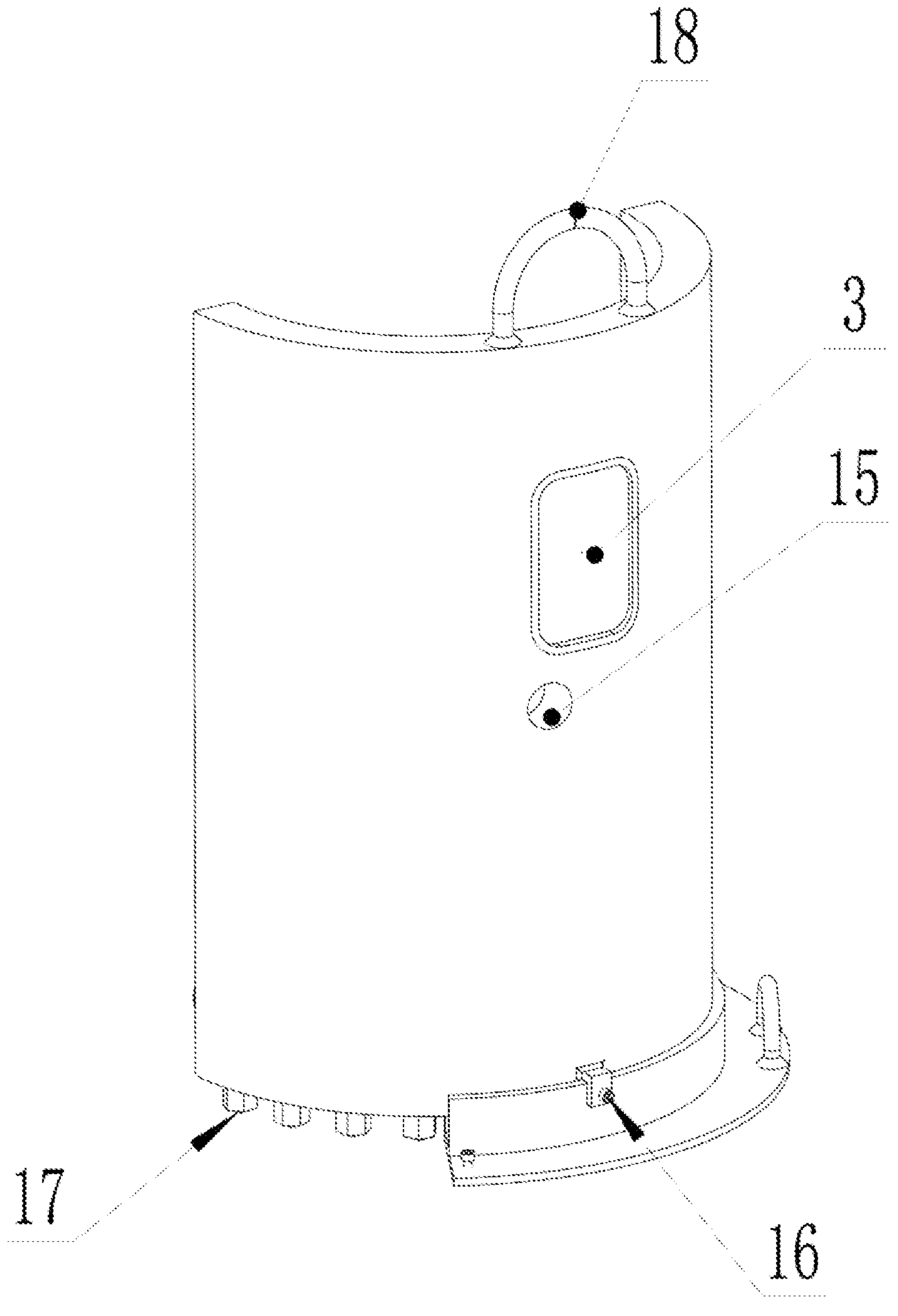
FIG. 5 is a structural schematic diagram of a slideway provided by the present disclosure.

By decomposing actions of source mounting and demounting operation process and using a simulated source to carry out a simulated source mounting experiment, the time occupied in each action in the operation process is counted, and the following technical actions are decomposed and listed, as shown in FIG. 2 to FIG. 3 and Table 1 and Table 2.

TABLE 1

| 205 Process time of each action in the source mounting process (unit: s) | | | | | |
|---|---|---|---|---|---|
| | First time | Second time | Third time | Fourth time | Fifth time |
| 210 Taking a source from a source container with a tool of source mounting and demounting | 12 | 14 | 15 | 12 | 13 |
| 215 Aligning a radioactive source with a source compartment installation hole | 5 | 5 | 5 | 5 | 5 |
| 220 Installing the radioactive source and getting out of a tool of source mounting | 39 | 39 | 35 | 45 | 41 |
| 225 Completing source mounting (total time) | 56 | 58 | 55 | 62 | 59 |

TABLE 2

| 305 Process time of each action in the source demounting process (unit: s) | | | | | |
|---|---|---|---|---|---|
| | First time | Second time | Third time | Fourth time | Fifth time |
| 310 Taking a source from an instrument with a tool of source mounting and demounting | 42 | 46 | 42 | 48 | 43 |
| 315 Moving a radioactive source into a source container | 5 | 5 | 5 | 5 | 5 |
| 320 Separating the radioactive source from the source tool of mounting and demounting | 15 | 12 | 13 | 13 | 14 |
| 325 Completing source demounting (total time) | 62 | 63 | 60 | 66 | 62 |

As shown in FIG. 2 to FIG. 3 and Table 1 and Table 2, the following conclusions can be obtained through decomposition of actions of source mounting 205 and demounting 305. Firstly, the operation time at an instrument end in the source mounting and demounting process accounts for relatively long in the whole operation process (accounting for about 69% in the source mounting process and 71% in the source demounting process). Secondly, the operation time of a radioactive source in the source container 5 accounts for about 21%-22% of total time, but the source container 5 has a certain shielding effect on radiation when the radioactive source operations in the source container 5, so the dose rate of radiation received by the worker during the operation is relatively small. Thirdly, the time of the tool of source mounting and demounting 6 holding the radioactive source passing from the source container 5 to the instrument source compartment hole or from the instrument source compartment hole to the source container 5 accounts for relatively small (about 8.0%-8.5%) of the total time.

In conclusion, the operation time at the instrument end in the source mounting 205 and demounting 305 process accounts for relatively long in the whole operation process. At the same time, considering that most accidents such as accidental jamming of the source during the source mounting and demounting occur at the instrument end, it is necessary to mount a shielding device at the instrument end, so that the worker can work calmly at a low radiation level during operation of the source mounting 205 and demounting 305 at the instrument end.

Specifically, disclosed is a shielding device of source mounting and demounting for a nuclear logging instrument, including a device base 8 and a shielding device body 2.

The device base 8 is directly placed on the ground 4 (or a well stand) and symmetrically spilt into a first section and a second section. One end of the first section is hinged with one end of the second section via an axis pin 11 and another end of the first section is detachably connected to another end of the second section via a fixing screw 9. The device base 8 is provided with a circular embedded slideway 14 and the shielding device body 2 is slidably installed inside the embedded slideway 14. On the inner side of the device base 8, each half of the device base is fixedly provided with a source receiving plate 12 via threads, the source receiving plate 12 is configured for preventing the radioactive source from falling off by accidents.

The shielding device body 2 is of a semicircular structure, and mounted with sliding blocks 17 at the bottom thereof. The device base 8 limits the shielding device body 2 by means of the embedded slideway 14. When the shielding device body 2 is installed in the embedded slideway 14, the sliding blocks 17 at the bottom are in plane contact with the embedded slideway 14. Lower rolling friction resistance allows the shielding device body 2 to move in the embedded slideway 14, so that the shielding device is aligned with a working surface of the instrument source compartment hole.

In one embodiment, considering heavy weight of the device base 8, if the shielding device is used on the ground 4 (neither drilling platforms nor other sites), casters or universal wheels can be arranged under the device base 8 to facilitate movement or installation of the device base 8.

In one embodiment, in order to facilitate the operation of the tool of source mounting and demounting 6 with the radioactive source passing through the shielding device body 2, the shielding device body 2 is provided with a circular hole 15 through which the tool of source mounting and demounting 6 passes. When the hole size of the circular hole 15 is small, the operation of the source mounting and demounting at the instrument end is greatly affected, possibly resulting in inconvenience in operation. If the hole size of the circular hole 15 is large, more direct radiation rays of the radioactive source leak, and the overall shielding performance of the shielding device is affected. Preferably, the hole size of the circular hole 15 is φ60 mm.

Preferably, the height of the circular hole 15 from the ground is about 1.3 m. It is proved that the height is more suitable for the source mounting and demounting.

In one embodiment, the source receiving plate 12 is of a replaceable design. The shielding device can be applied to instruments with different diameters by changing the size of a central hole of the source receiving plate 12.

In one embodiment, in order to ensure that the shielding device has sufficient shielding capability and the worker can clearly see the source compartment hole at the instrument end and the process of the source mounting and demounting, a window 3 for visual observation is provided in the shielding device body 2, and the rectangular window 3 is embedded and filled with transparent substances with a deceleration effect on rays.

In one embodiment, the shielding device body 2 can be filled with different shielding materials according to different types of rays to be shielded. For neutron rays, the shielding materials are all kinds of filling materials rich in H element, and the shielding device body 2 can be filled with water, paraffin wax and a boron-containing polyethylene board and the like as shielding deceleration materials, preferably, boron-containing polyethylene board is used as the filling material. Various experiments show that boron-containing polyethylene board has obvious advantages over the above-mentioned other materials in deceleration of fast neutrons and slow absorption of slow neutrons. For gamma rays, the shielding device body 2 can be filled with materials with high atomic number such as lead, copper and stainless steel as shielding materials, preferably, lead is used as the filling material of the gamma shielding device. Compared with other heavy metal materials, lead has the characteristics of good cost performance, good shielding performance and easy molding and processing.

In one embodiment, the window 3 embedded in the shielding device body 2 can be filled with different materials according to different types of rays to be shielded. Preferably, for neutron rays, the window 3 can be filled with water and organic glass with a certain thickness as window materials: for gamma rays, the window 3 can be equipped with lead glass with high light transmittance as a window material.

Through the above technical solutions, during the source mounting operation, the worker takes the source from the source container 5, the radioactive source passes through the shielding device body 2 through the circular hole 15 of the shielding device body 2 to be installed. During the source demounting operation, the radioactive source and the worker are arranged on both sides of the shielding device body 2 during the operation at the instrument end. Through such design, the worker working for a long time at the instrument end is under the protection of the shielding device, and the worker is allowed to calmly mount and demount the source in a relatively low radiation field.

The technical solution of the present disclosure is performed as follows.

(1) Source Mounting Process

Firstly, after a radioactive logging instrument 1 is rigidly connected with other drill collars or drill pipes, adjusting the height of the instrument so that the height from the source compartment hole to the well stand (or ground) is about 1.3 m.

Secondly, opening a plug of the source compartment hole and cleaning the source compartment hole.

Thirdly, installing the device base 8 and tightening the fixing screw 9.

Fourthly, installing the shielding device body 2 into the embedded slideway 14, sliding the shielding device body 2 along the embedded slideway 14 until the circular hole 15 is approximately aligned with the source compartment hole, and tightening a limiting screw 16 (the limiting screw 16 limits the positions of the shielding device body 2 and the device base 8, and the limiting screw 16 is directly removed when it is unnecessary to limit the positions of the shielding device body 2 and the device base 8).

Fifthly, completing the source mounting operation according to the source mounting process (unnecessary details in the process are not given).

Sixthly, lowering the logging instrument to a safe distance below a wellhead and removing the shielding device.

(2) Source Demounting Process

Firstly, installing the device base 8, and installing two parts of the device base 8 at a certain opening angle (some instruments have raised ribs, and if the device base is completely closed, the raised ribs can lift the shielding device together in the process of lifting the instruments, resulting in potential safety hazards).

Secondly, installing the shielding device body 2 into the embedded slideway 14, firstly fixing the shielding device body 2 to one of two parts of the device base 8, and tightening the limiting screw 16.

Thirdly, lifting the instrument up to the height of the source compartment hole from the ground by about 1.3 m.

Fourthly, completely closing the two parts of the device base 8, and tightening the fixing screw 9.

Fifthly, loosening the limiting screw 16, and sliding the shielding device body 2 in the embedded slideway 14, so that the circular hole 15 is approximately aligned with the source compartment hole, and tightening the limiting screw 16.

Sixthly, disassembling the radioactive source according to normal source demounting process and placing the radioactive source back into the source container 5 (unnecessary details in the process are not given).

Seventhly, completing all demounting operations, transporting the source container 5 back to a source warehouse or a source car, and removing the shielding device.

The technical solutions of the present disclosure are further described in conjunction with the following embodiments.

Embodiment I

In the embodiment, the shielding device is used for shielding and protecting a gamma logging source.

Figure 1:
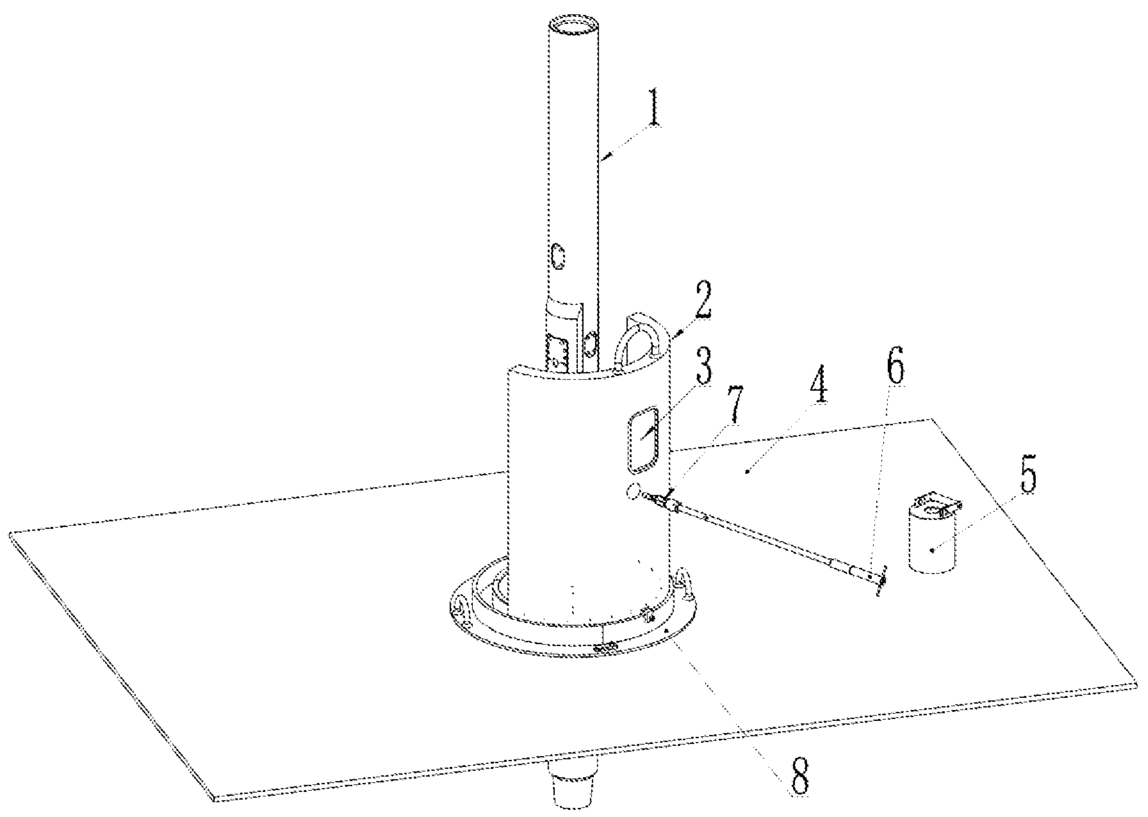
FIG. 1 is a structural schematic diagram of a shielding device of source mounting and demounting provided by the present disclosure.

Preferably, as shown in FIG. 1, the shielding device body 2 includes a stainless steel shell and a lead inner core with an effective thickness of 20 mm. The rectangular window 3 is filled with lead glass with a lead equivalent of 3 mm.

Through the configuration of the above technical solutions, it is measured by experiments that the radiation dose rate at a rear end of the shielding device body 2 is about 1.5 uSv/s when the standard 1.8Ci gamma source is placed at a distance of 0.8 m form the front end of the shielding device body 2, and the radiation dose rate is obviously lower than that when the shielding device is not arranged.

Embodiment II

In the embodiment, the shielding device is used for shielding and protecting a neutron logging source.

Preferably, as shown in FIG. 1, the shielding device body 2 includes a stainless steel shell and a boron-containing polyethylene board with an effective thickness of 100 mm. The rectangular window 3 is filled with organic glass with a thickness of 100 mm.

Furthermore, in order to avoid the influence of secondary gamma rays, a lead layer with a thickness of 2 mm is also arranged on the outer side of the boron-containing polyethylene board.

Through the configuration of the above technical solutions, it is measured by experiments that the radiation dose rate at a rear end of the shielding device body 2 is about 2.3 uSv/s when the standard 18Ci neutron source is placed at a distance of 0.8 m from the front end of the shielding device body 2, and the radiation dose rate is obviously lower than that when the shielding device is not arranged.

It needs to be noted that for those skilled in the art, obviously the present disclosure is not limited to the details of the exemplary embodiments, and the present disclosure can be achieved in other specific forms without departing from the spirit or essential characteristics of the present disclosure. Therefore, for every point, the embodiments should be regarded as exemplary embodiments and unrestrictive, the scope of the present disclosure is restricted by the claims appended hereto, therefore, all modifications, including the meanings and scopes of equivalent elements, of the claims are aimed to be included in the present disclosure, and any mark of accompanying drawings in the claims should not be regarded as limitation to the involved claims.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A shielding device of source mounting and demounting for a nuclear logging instrument, comprising:

a device base, wherein the device base is directly placed on a well stand and symmetrically spilt into a first section and a second section, one end of the first section is hinged with one end of the second section and another end of the first section is detachably connected to another end of the second section;

a top surface of the device base is provided with a circular embedded slideway, and a middle part of the device base, located on an inner side of the embedded slideway, is detachably provided with a source receiving plate; and a shielding device body, wherein the shielding device body is of a semicircular structure, a sliding block is arranged at a bottom of the shielding device body, the sliding block is slidably assembled in the embedded slideway, the shielding device body is provided with a circular hole through which a tool of source mounting and demounting passes, and a height of the circular hole corresponds to a height of an instrument source compartment hole;

said height of the circular hole being higher than a height of an upper surface of the source receiving plate; and the source receiving plate being configured for preventing a radioactive source from falling off by accidents, a size of a central hole of the source receiving plate being changeable according to a diameter of the nuclear logging instrument.

2. The shielding device of source mounting and demounting for a nuclear logging instrument according to claim 1, wherein:

a window for visual observation is provided in the shielding device body; and transparent glass is embedded in the window; and the circular hole is located below the window.

3. The shielding device of source mounting and demounting for a nuclear logging instrument according to claim 2, wherein the transparent glass embedded in the shielding device body is filled with different shielding materials according to different types of rays to be shielded.

4. The shielding device of source mounting and demounting for a nuclear logging instrument according to claim 3, wherein the transparent glass is organic glass or lead glass.

5. The shielding device of source mounting and demounting for a nuclear logging instrument according to claim 1, wherein the shielding device body is filled with different shielding materials according to different types of rays to be shielded.

6. The shielding device of source mounting and demounting for a nuclear logging instrument according to claim 1, wherein:

one end of the first section is hinged with one end of the second section via an axis pin;

the other end of the first section is detachably connected to the other end of the second section via a fixing screw; and lifting lugs are symmetrically arranged on the first section; and the second section of the device base and configured for hoisting the device base.

7. The shielding device of source mounting and demounting for a nuclear logging instrument according to claim 1, wherein:

the source receiving plate is installed on the shielding device body via a connecting screw.

8. The shielding device of source mounting and demounting for a nuclear logging instrument according to claim 1, wherein a hole size of the circular hole is φ60 mm; and a height of the circular hole from the ground is 1.3 m.

* * * * *